June 11, 1929.     J. M. L. FERRARI     1,717,018
MOVEMENT GOVERNOR WITH PROGRESSIVE SPEED OR RACE VARIATIONS
Filed May 25, 1926
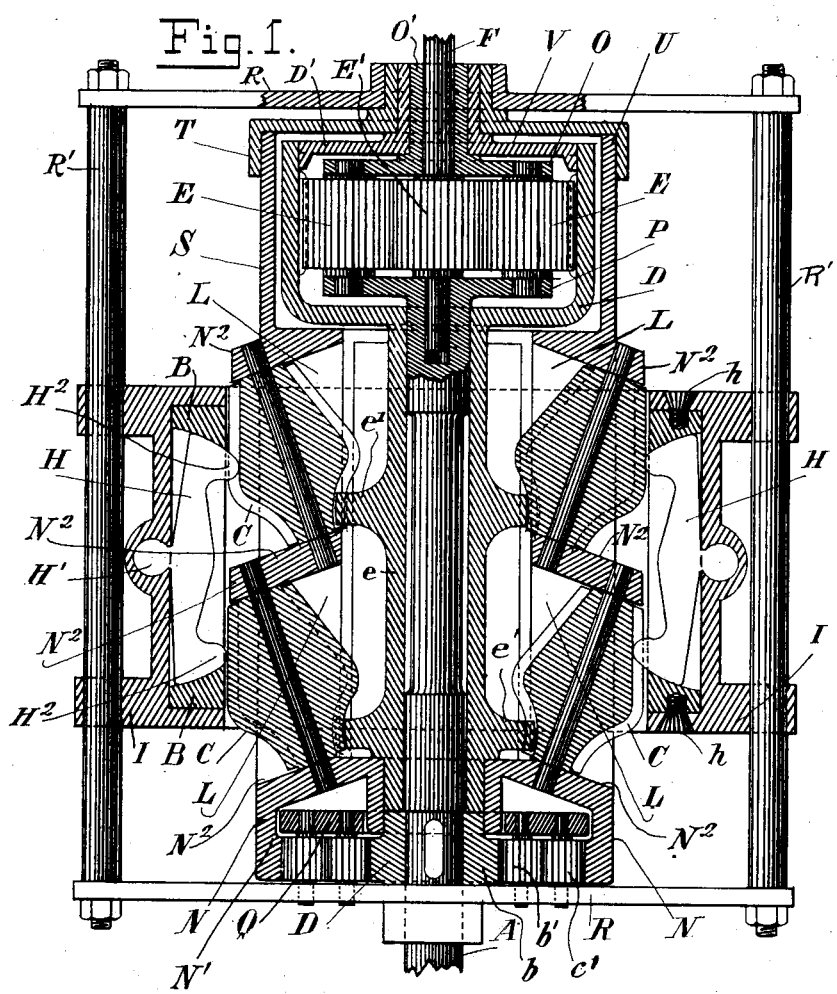
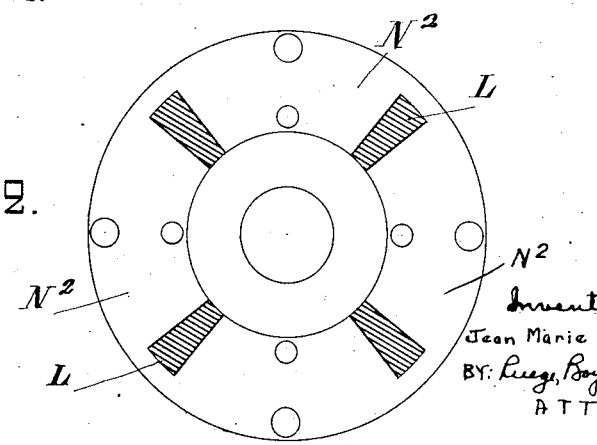
Inventor:
Jean Marie Laurent Ferrari
BY: Luigi, Boyer & Bakelev
ATTORNEYS.

Patented June 11, 1929.                                          1,717,018

UNITED STATES PATENT OFFICE.

JEAN MARIE LAURENT FERRARI, OF TOULON, FRANCE.

MOVEMENT GOVERNOR WITH PROGRESSIVE SPEED OR RACE VARIATIONS.

Application filed May 25, 1926, Serial No. 111,519, and in France June 29, 1925.

This invention relates to an improved change-speed and reverse gearing, the object of the invention being to provide an improved gear system which is at all times in mesh and by means of which a gradual increase or decrease in speed in both forward and reverse directions may be imparted to a driven shaft.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Fig. 1 is a central longitudinal sectional view of the improved device; and

Fig. 2 is a transverse sectional view of a gear carrying cage forming a part of the improved device.

The same characters of reference designate the same parts in the different figures of the drawings.

Referring to the drawings, A designates a driving shaft mounted for rotation in the end members R of a fixed frame. Said shaft is provided at one end with a flange P, in which are secured a plurality of stud shafts each carrying a planet pinion E, the opposite ends of said stud shafts being secured in a disk O which is provided centrally thereof with a tubular trunnion O' which forms one of the journals for the driving shaft, and within which the driven shaft F is mounted for rotation, said driven shaft extending for a short distance into an opening in the end of the driving shaft and provided with a pinion E' in mesh with the planet pinions E. Keyed to the driving shaft A adjacent to the opposite end member R of the frame is a gear $b$. Encircling the driving shaft between said gear and the opposite end of the shaft is a sleeve $e$ which is rotatable on the shaft A, said sleeve having formed thereon a pair of gears $e'$. The sleeve $e$ is further provided with a housing D which is internally toothed for engagement with the planet wheels E and provided with an end wall D' having a hollow trunnion encircling that of the disk O.

Mounted for rotation on the sleeve $e$ is a cage N having at one end an enlarged head provided with an internal orbit gear N', between which orbit gear and the gear $b$ of the driving shaft two series of pinions $b'$, $c'$ are mounted for rotation on stud shafts each secured at one end in the end wall of the frame R and at its opposite end in a plate or disk Q. The cage N carries at its opposite end a housing S which encircles the housing D of the sleeve $e$ and is provided with a flanged end wall T having a tubular trunnion encircling that of the sleeve. The cage N is further provided with a plurality of walls $N^2$ which are angularly disposed with relation to the longitudinal axis of the driving shaft, said walls being interconnected by webs L. Between the webs L a plurality of stud shafts are secured in the walls $N^2$ at right angles thereto, each of said stud shafts having mounted for rotation thereon a double-cone gear C, one of the cone portions of each of which is in mesh with the gears $e'$ of the sleeve $e$, as indicated at $f$.

The end walls R of the gear frame are secured together by spacing rods R', on which is mounted for sliding movement a hollow drum or housing I, the interior of which is lined with a plurality of blades H lying in juxtaposition to each other and each provided with a rib or knee H' seated in a recess in the wall of the drum whereby the blades are adapted to have a rocking motion radially of the drum. Each of the blades H is provided at its opposite ends with a pair of projections or noses $H^2$ adapted to engage the cone gears C along lines parallel with the driving shaft. A pair of guide rings B are provided in the drum I for guiding the rocking members H, said rings being secured in position by screws $h$.

It is believed that the operation of the device above described will be clear from the foregoing, taken in connection with the drawings. Assuming the driving shaft and its gear $b$ to be rotating in the direction indicated by the arrow, the pinions $b'$ and $c'$ and the orbit gear N' will be caused to rotate in the directions also indicated by arrows, thus rotating the entire cage together with the double-cone gears C carried thereby. During this rotation the gears C are caused to rotate on their respective axes in the direction indicated by the arrows, by reason of their engagement with the blades H, thus transmitting motion to the sleeve $e$ by means of the gears $e'$, and through said sleeve to the housing D, the internal gear of which transmits motion by means of the planet pinions E to the driven shaft F in a manner which will be readily understood. It is to be noted, however, that the planets E are at the same time being rotated bodily around the axis of the driven shaft by the rotation of the driving shaft, which latter shaft rotates in the same direction as the housing D. It is owing to the relation of these two motions that the progressive changes in the speed of the driven shaft F, its complete stoppage and the reversal of its direction of rotation is accomplished. The ratio of all of the gears is calculated so that when the rocking members H are in engagement with the gears C at the longitudinal center of their cone portions, the orbit wheel D drives the pinions E at such a speed that, for each complete revolution of the driving shaft, any point in the circumference of the pinions E will move through a distance equal to the circumference of the gear E' on the driven shaft, so that no motion will be imparted to the latter shaft. The housing I is intended to be slid along the rods R' by means of a suitable hand lever (not shown). It will thus be readily seen that, starting from the initial or neutral position, if the housing is shifted so as to carry the members H into engagement with the portion of the cone gears C having the largest diameter the speed of the orbit D will be less than that of the driving shaft A, so that for each complete revolution of the latter any point on the circumference of the planet gears E will be moved through a distance less than the circumference of the central gear E', which will thus be caused to rotate in the same direction as the driving shaft, the speed of rotation of the driven shaft varying with the position of the members H with relation to diameter of the cone gears. In other words, the nearer the members approach that end of the cone gears having the largest diameter the greater will be the speed of the driven shaft in the same direction as the driving shaft. In like manner, it will be obvious that when the housing I is shifted to carry the members H into position to engage the gears C at the opposite side of the central or neutral position the speed of the orbit gear D will be progressively greater than that of the driving shaft as the members H approach nearer and nearer the small ends of the gears C, thus causing rotation of the planet gears E in a direction opposite from that in which they are rotated when the members H are in engagement with the gears C at the portions thereof having the larger diameter, thus rotating the driven shaft in a direction opposite to that of the driving shaft.

Having thus described my invention, what I claim is:

1. A motion transmitting mechanism, comprising a driving shaft and a driven shaft, two series of cone gears disposed around said driving shaft, the axes of said cone gears extending at an angle to that of the driving shaft, means operable by the driving shaft for bodily moving said cone gears around the axis of the driving shaft, an axially slidable member disposed in encircling relation to said cone gears and fixed against rotation, a plurality of members pivotally mounted in said shiftable member and each having a pair of projections for engagement with one gear of either series thereby to cause rotation of the cone gears on their axes during rotation of the driving shaft, and gearing between said cone gears and the driven shaft for rotating the latter.

2. In a power transmission the combination of two circular members in mesh with each other, at least one of said members being rotatably mounted, one of said members having pitch circles with different linear speeds, a driving shaft for driving the latter in a path concentric with said shaft, means for moving said meshing members relatively to each other to vary the ratio of the pitch circle, a driven shaft in line with the driving shaft, gearing cooperating with the driven shaft and with the member having pitch circles with different linear speeds, one of said circular meshing members consisting of a plurality of movable blades arranged in juxtaposition to each other and forming a closed ring, a ring shaped housing for said blades, the latter being movably lodged within said housing and lining same, the other circular meshing member having teeth in engagement with the lining parts of the blades, and means for keeping said lining parts of the blades always in cooperation with said teeth and constraining the lining parts of the blades to follow the circumference of said teeth.

3. In a speed change gear, the combination of a driving shaft, a set of cone gears having operative surfaces disposed parallel to said shaft, said gears being rotated by the latter through a path concentric with the driving shaft, a driven shaft in line with the driving shaft, a gear cooperating with the driven shaft and with the set of cone gears, a plurality of movable blades arranged in juxtaposition to each other and forming a closed ring, a ring shaped housing for said blades, the latter being movably lodged within said housing and lining same, the teeth of the cone gears in engagement with the lining parts of the blades, means for keeping said lining parts of the blades always in cooperation with said teeth and constraining the lining parts of the blades to follow the circumference of said teeth, and means for moving said closed ring relatively to the set of cone gears to vary the rotating speed of the cone gears.

4. In a power transmission, the combination of a driving shaft, a set of two cone gears having operative surfaces disposed parallel to and rotatable around said shaft, a driven shaft in line with the driving shaft, a gear cooperating with the driven shaft and with the set of cone gears, a circular member containing a plurality of movable blades in juxtaposition and forming a closed ring concentric with the shafts, a slidably mounted ring shaped housing for said blades, means for moving said housing parallel to the shafts, a circular groove in the interior wall of said housing concentric with the shaft, each blade provided with a knee lodged in said circular groove and adapted to have a rocking motion radially of the housing and having two projections for alternatively engaging with the teeth and gaps of the set of cone gears, the blades and the cone gears being so constructed and so arranged that the blades follow the circumference of the teeth and gaps of the cone gears.

5. A change-speed power transmission, comprising in combination a driving shaft and a driven shaft, a plurality of movable blades arranged in juxtaposition to each other in circular bearings and forming a closed ring, a pair of gears disposed in contiguous relation to said blades and having pitch circles of different linear speeds, said blades having projections forming teeth constantly in mesh with one or the other of said gears, means operated by the driving shaft for moving said gears through a path concentric with said driving shaft, means for moving said blades to different pitch circles along said gears, and means for transmitting motion from said gears to the driven shaft, the organization being such as to impart to the driven shaft progressive differences of speed, change of direction of rotation and complete stoppage, during continuous rotation of the driving shaft.

6. A change-speed power transmission, comprising in combination a driving shaft and a driven shaft, a plurality of oscillatory blades disposed side by side in a longitudinally displaceable ring concentric with said driving shaft, said blades having teeth-forming projections, a cage mounted for rotation by said driving shaft, double conical pinions mounted for rotation in said cage in mesh with the teeth of said blades, a hollow shaft having gears in mesh with said double conical pinions and provided with an interiorly toothed housing, a pinion keyed to the driven shaft, and planet pinions in mesh with said interiorly threaded housing and said driven shaft pinion, the organization being such that the displacement of the ring carrying the oscillatory blades on the conical pinions will impart to the driven shaft progressive variations in speed, complete stoppage and change of direction of motion during continuous rotation of the driving shaft.

In testimony whereof I have signed my name to this specification.

JEAN MARIE LAURENT FERRARI.